US008769623B2

(12) United States Patent
Dec et al.

(10) Patent No.: US 8,769,623 B2
(45) Date of Patent: Jul. 1, 2014

(54) GROUPING MULTIPLE NETWORK ADDRESSES OF A SUBSCRIBER INTO A SINGLE COMMUNICATION SESSION

(75) Inventors: Wojciech L. Dec, Amsterdam (NL); Jean-Philippe Champagne, Raleigh, NC (US); Piyush Agarwal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 13/248,317

(22) Filed: Sep. 29, 2011

(65) Prior Publication Data
US 2013/0086634 A1 Apr. 4, 2013

(51) Int. Cl.
*H04L 29/06* (2006.01)
(52) U.S. Cl.
USPC .................................... 726/4; 726/3; 726/5
(58) Field of Classification Search
USPC .............. 726/3–5, 11–13; 713/162–163
See application file for complete search history.

(56) References Cited

U.S. PATENT DOCUMENTS

| 6,574,664 | B1 * | 6/2003 | Liu et al. .................. 709/224 |
| 7,917,941 | B2 | 3/2011 | Wallman |
| 7,996,521 | B2 | 8/2011 | Chamberlain et al. |
| 8,161,284 | B1 | 4/2012 | Schmidt et al. |
| 2001/0039590 | A1 * | 11/2001 | Furukawa et al. ........... 709/238 |
| 2002/0073338 | A1 * | 6/2002 | Burrows et al. .............. 713/201 |
| 2005/0177750 | A1 * | 8/2005 | Gasparini et al. ............ 713/201 |
| 2008/0092228 | A1 * | 4/2008 | Baum ........................... 726/13 |
| 2009/0133088 | A1 * | 5/2009 | Kim et al. .................... 725/116 |

* cited by examiner

*Primary Examiner* — Chau Le
(74) *Attorney, Agent, or Firm* — Baker Botts L.L.P.

(57) ABSTRACT

An apparatus includes a processor, an interface, and a memory. The interface is operable to receive a request from a subscriber to access network services, wherein the request includes a subscriber address from the set comprising: an IP address and a media access control (MAC) address. The processor is operable to generate a query requesting an address associated with the subscriber address. The interface is further operable to communicate the query to the subscriber address, and receive a response to the query, wherein the response includes an address associated with the subscriber address, wherein the associated address is from the set comprising: an IP address and a MAC address. The memory is operable to store the subscriber address and the received associated address.

17 Claims, 3 Drawing Sheets

GROUPING MULTIPLE NETWORK ADDRESSES OF A SUBSCRIBER INTO A SINGLE COMMUNICATION SESSION

TECHNICAL FIELD OF THE INVENTION

This invention relates generally to network addresses, and more particularly to grouping multiple network addresses of a subscriber into a single communication session.

BACKGROUND OF THE INVENTION

Network subscribers are often associated with an address that can be used to identify particular network components. A network gateway may authenticate an address to verify that a subscriber associated with the address is authorized to access network services. In certain situations, subscribers may be associated with multiple addresses.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Overview

The teachings of the present disclosure relate to an apparatus that includes a processor, an interface, and a memory. The interface is operable to receive a request from a subscriber to access network services, wherein the request includes a subscriber address from the set comprising: an IP address and a media access control (MAC) address. The processor is operable to generate a query requesting an address associated with the subscriber address. The interface is further operable to communicate the query to the subscriber address, and receive a response to the query, wherein the response includes an address associated with the subscriber address, wherein the associated address is from the set comprising: an IP address and a MAC address. The memory is operable to store the subscriber address and the received associated address.

Description

Figure 1:
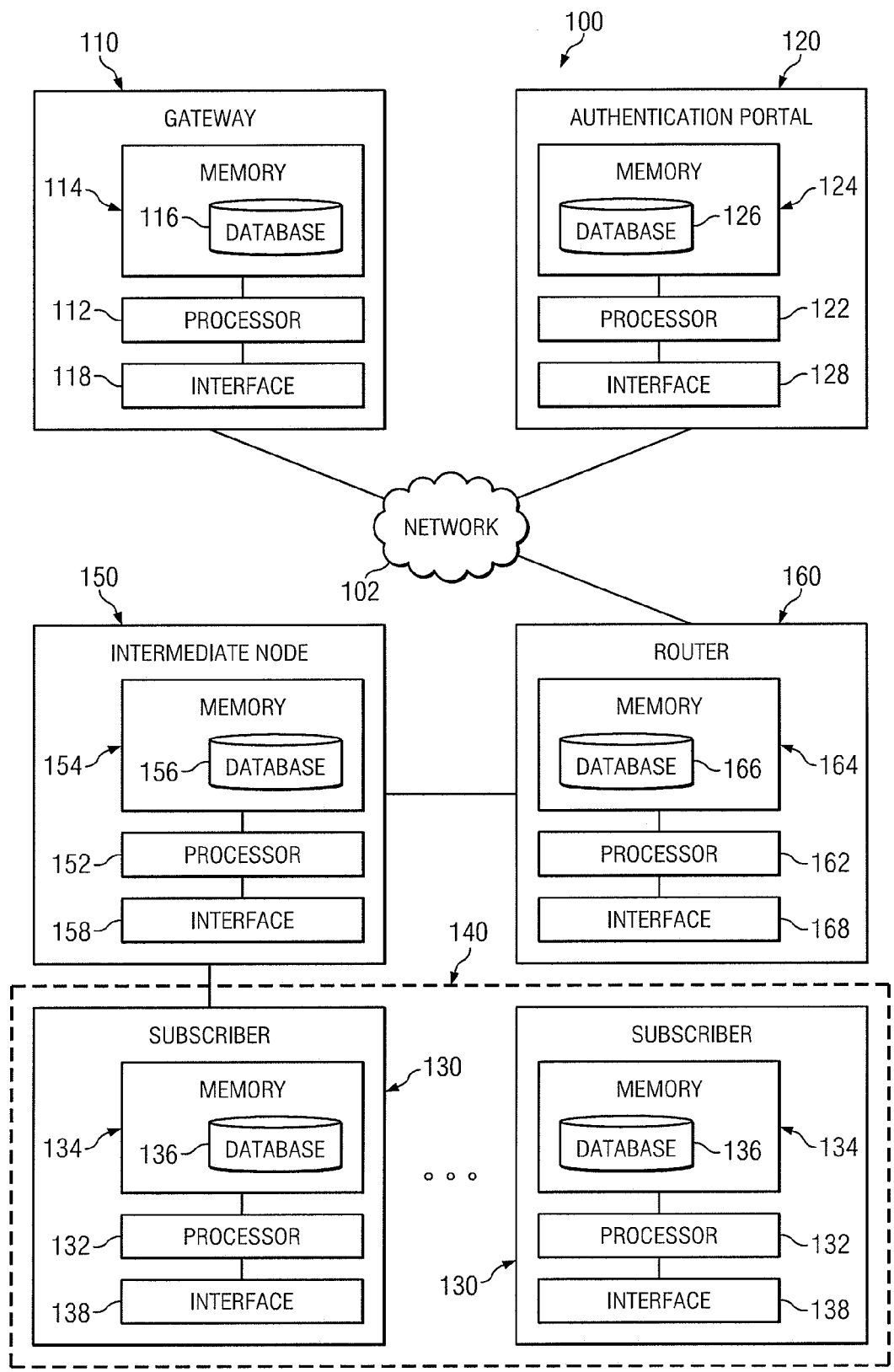
FIG. 1 illustrates a block diagram of an example of system for grouping multiple addresses of a subscriber into a single communication session.
Figure 2A:
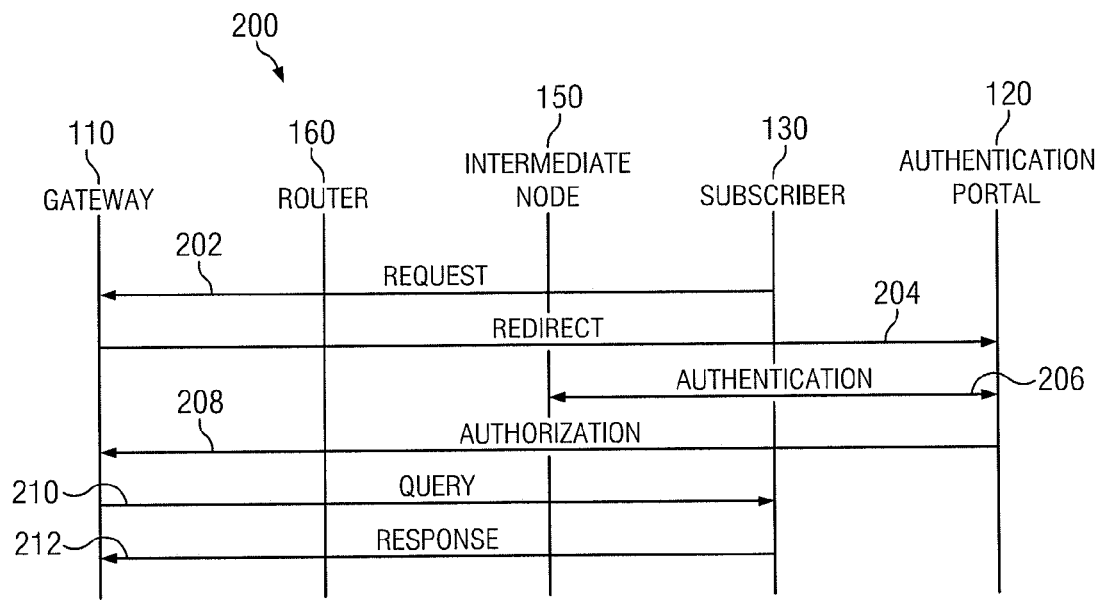
FIGS. 2A-B illustrate sequence diagrams of examples of grouping multiple addresses of a subscriber into a single communication session.
Figure 2B:
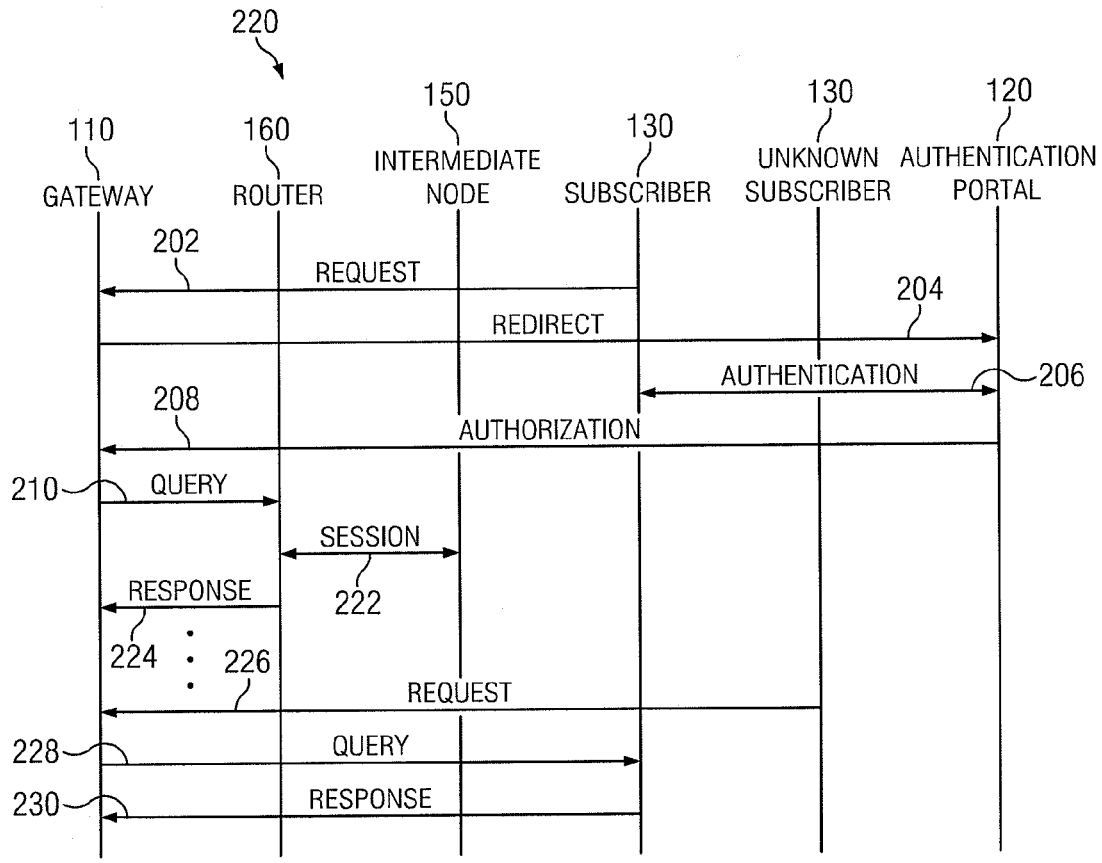
Figure 3:
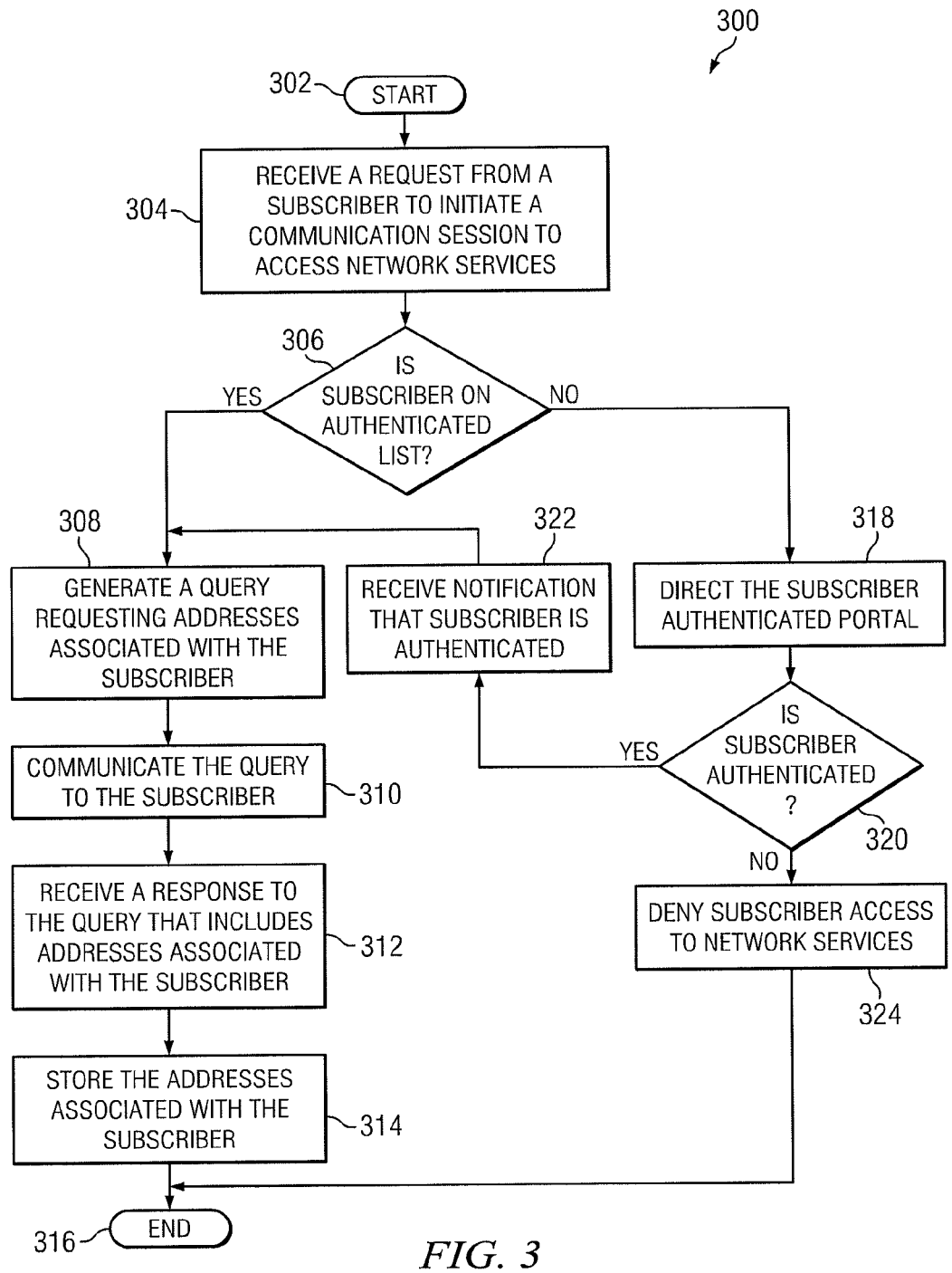
FIG. 3 illustrates an example of a method for grouping multiple addresses of a subscriber into a single communication session.

Embodiments of the present invention and its advantages are best understood by referring to FIGS. 1 through 3 of the drawings, like numerals being used for like and corresponding parts of the various drawings.

FIG. 1 illustrates a block diagram of an example of system 100 for grouping multiple network addresses (e.g., internet protocol (IP) addresses and media access control (MAC) addresses) into a single communication session. System 100 includes network 102, gateway 110, authentication portal 120, subscribers 130, intermediate node 150, and/or router 160. In certain embodiments, system 100 further includes a group 140 of associated subscribers 130. Components of system 100, such as gateway 110, authentication portal 120, subscribers 130, intermediate node 150, and/or router 160 may include one or more of a processor, a memory, a database, an interface, and logic.

A processor represents any computing device, such as processors 112, 122, 132, 152, and 162, configured to control the operation of one or more components of system 100. A processor may comprise one or more processors and may be a programmable logic device, a microcontroller, a microprocessor, any suitable processing device, or any suitable combination of the preceding. A processor includes any hardware and/or software that operates to control and process information received by a component of system 100. In certain embodiments, a processor communicatively couples to other components of system 100, such as a memory (e.g., memories 114, 124, 134, 154, and 164), an interface (e.g., interfaces 118, 128, 138, 158, and 168), or any other suitable component.

A memory represents any device, such as memories 114, 124, 134, 154, and 164, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases, such as databases 116, 126, 136, 156, and 166.

An interface represents any device, such as interfaces 118, 128, 138, 158, and 168, operable to receive input, send output, process the input and/or output, and/or performs other suitable operations for a component of system 100. An interface includes any port or connection, real or virtual, including any suitable hardware and/or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

Logic may perform the operation of any component of system 100, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer and/or processor. Certain logic, such as a processor, may manage the operation of a component.

Network 102 represents any suitable network operable to facilitate communication between components of system 100, such as gateway 110, authentication portal 120, subscriber 130, intermediate node 150, and/or router 160. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. In certain embodiments, particular features or services of network 102 are restricted by gateway 110.

Gateway 110 represents a component operable to control access by other components of system 100 to features and services of network 102. Gateway 110 may be operable to receive requests to access network services, authenticate subscriber addresses (e.g., IP addresses or MAC addresses), direct subscribers 130 to authentication portal 120, communicate queries requesting addresses associated with subscribers 130, and receive responses to the queries. In certain embodiments, gateway 110 receives a request to access network services from subscriber 130. Gateway 110 may authenticate subscriber 130 to ensure subscriber 130 is authorized to access network services. In an embodiment, gateway 110 authenticates subscriber 130 by verifying that an address included in the request from subscriber 130 is an authorized address, for example, by checking a list of authorized addresses. If the subscriber address is not authorized, gateway 110 may direct subscriber 130 to authentication portal 120 for further authentication.

In particular embodiments, gateway 110 represents an intelligent services gateway operable to control subscriber 130 access to network services, for example, internet access, bandwidth, media (e.g., audio, video, text, etc.), content (e.g., music, movies, television, games, books, newspapers, magazines, etc.), telephone services, telecommuting services, home remote monitoring and control services, content filtering (e.g., parental controls), network protection (e.g., antivirus protection, spam control, secured network access, etc), or any other service that may be delivered over network 102. Gateway 110 may further be operable to track and/or differentiate service usage by subscribers 130, for example, for access or billing purposes. Gateway 110 may map communications and endpoints to IP addresses for interoperable communication. In certain embodiments, gateway 110 is operable to identify communication sessions, for example, by session attribute (e.g., MAC address, virtual local area network identification (VLAN ID), virtual route forwarding (VRF) identification, calling line identification (CLID), source IP address, port bundle first hop key (PBHK), network access server (NAS) port, session identification, ascent server key, graphical user interface identification, domain name, username, etc). In certain embodiments, gateway 110 includes processor 112, memory 114, database 116, and/or interface 118.

Authentication portal 120 represents a component, for example a web portal, operable to authenticate subscriber 130 to verify that subscriber 130 is authorized to access particular network services. In certain embodiments, if gateway 110 is unable to authenticate subscriber 130, gateway 110 directs subscriber 130 to authentication portal 120 for further authentication. Authentication portal 120 may authenticate subscriber 130 in any suitable manner, such as through interactive authentication (e.g., requesting and receiving login information from subscriber 130), digital key exchange, or any other method suitable to identify subscriber 130. In an embodiment, authentication portal 120 stores authenticated subscriber addresses, subscriber login credentials, digital keys, or other data useful to authenticate subscribers 130 in a database (e.g., database 126). In certain embodiments, authentication portal 120 includes processor 122, memory 124, which comprises database 126, and/or interface 128.

Subscriber 130 represents a component communicatively coupled to network 102 operable to communicate over network 102 (e.g., a server, proxy server, router, mobile phone, set-top unit (STU), personal computer, tablet, telephone, television, or other suitable device). Subscriber 130 may be associated with multiple addresses and may use multiple addresses during a single communication session. For example, subscriber 130 may execute a dual stack with one or more of IPv4 and IPv6 IP addresses, or may utilize a plurality of IPv6 IP addresses. Subscriber 130 may additionally be associated with one or more MAC addresses. In certain embodiments, subscriber 130 includes processor 132, memory 134, database 136, and/or interface 138.

In certain embodiments, gateway 110 provides network access to group 140 of subscribers 130 in a single communication session. Group 140 represents a collection of related subscribers 130 that may share a communication session, for example, a household, a business, or any other suitable grouping. Subscribers 130 may be associated in group 140 to facilitate particular billing models for network services.

Intermediate node 150 represents a component on a communication path between router 160 and subscriber 130. Intermediate node 150 may be a router, a switch, a bridge, or other network node. Intermediate node 150 may store addresses routable through intermediate node 150 in a database (e.g., database 156), which includes addresses associated with subscriber 130. In certain embodiments, if router 160 does not have network bindings to subscriber 130 and is unable to route messages to the address of subscriber 130, router 160 may determine addresses routable through intermediate node 150 to router 160. Because intermediate node 150 can route information to subscriber 130, addresses associated with subscriber 130 will be included in the addresses routable through intermediate node 150. In certain embodiments, intermediate node 150 includes processor 152, memory 154, database 156, and/or interface 138.

Router 160 represents a component on a communication path between gateway 110 and subscriber 130 operable to communicate information over network 102. Router 160 may include a routing table (e.g., stored in database 166) of network components to facilitate routing decisions. Router 160 may communicate messages from gateway 110 to subscriber 130. In certain situations, router 160 does not have necessary network bindings (e.g., layer 2 and layer 3) to route messages to subscriber 130. However, in such situations, router 160 will have a route to subscriber 130 via intermediate node 150 and necessary network bindings to intermediate node 150.

Router 160 may respond to a query from gateway 110 with one or more internet addresses routable through intermediate node 150. In certain embodiments, router 160 may respond to the query with all Internet addresses routable through intermediate node 150, thus ensuring that the internet addresses associated with subscriber 130 are included in the response. In this way, router 160 can provide gateway 110 with the requested internet associated addresses despite not having network bindings with subscriber 130 necessary to route the query from gateway 110 to subscriber 130. In certain embodiments, router 160 includes processor 152, memory 154, database 156, and/or interface 138. In an embodiment, router 160 stores authenticated subscriber internet addresses, subscriber login credentials, digital keys, or other authentication data in a database (e.g., database 156).

In an exemplary embodiment of operation, gateway 110 receives a request from subscriber 130 to access network services, where the request includes an internet address associated with subscriber 130. Gateway 110 authenticates subscriber 130 to verify that subscriber 130 is authorized to access network services. Gateway 110 may authenticate subscriber 130 in any suitable manner, and in particular embodiments, authenticates subscriber 130 by accessing a list of subscriber internet addresses authorized to access the network service (e.g., stored in database 116) and comparing the internet address from the request to the authorized list of subscriber internet addresses. If gateway 110 is unable to authenticate subscriber 130, for example, because the internet address of subscriber 130 does not correspond to an authorized internet address, gateway 110 may direct subscriber 130 to authentication portal 120. In an embodiment, authentication portal 120 authenticates subscriber 130 through any suitable method, such as interactive authentication (e.g., requesting and receiving login information from subscriber 130) and digital key exchange. If authentication portal 120 authenticates subscriber 130, authentication portal 120 may communicate an authorization message to gateway 110 notifying gateway 110 that subscriber 130 is authenticated.

After authentication, gateway 110 communicates a query to subscriber 130 requesting network addresses associated with subscriber 130 (e.g., IPv4 address, IPv6 address, and/or MAC address). The query may include commands, security measures (e.g., nonce, passwords, digital keys, etc), protocols (e.g., internet control message protocol version 4 (ICMPv4), ICMPv6, user datagram protocol (UDP), network layer signaling-transport layer (NLS-TL), or other suitable protocol), or other suitable information. If the query routes to subscriber 130, subscriber 130 may respond with one or more addresses associated with subscriber 130. In an embodiment, the subscriber address is a MAC address, and the query requests one or more IP addresses associated with the subscriber address. In another embodiment, the subscriber address is an IP address, and the query requests one or more MAC addresses associated with the subscriber address.

In certain embodiments, the query cannot route to subscriber 130, for example, because router 160 does not have suitable network bindings to subscriber 130. Therefore, router 160 is operable to identify a route to subscriber 130 through intermediate node 150, which router 160 has the necessary network bindings. Router 160 may identify addresses routable through intermediate node 150, and respond to the query with one or more of those addresses. In an embodiment, router 160 responds to the query with all addresses routable through intermediate node 150.

In embodiments where router 160 does not have necessary network bindings, the query response may not include all addresses associated with subscriber 130 (e.g., a subscriber 130 device is turned off, malfunctioning, adopted a new subscriber address, or has not yet sent traffic to gateway 110). Gateway 110 may communicate another query requesting addresses associated with subscriber 130 if, during the communication session, gateway 110 receives requests from unknown addresses. Gateway 110 may update the authorized list of subscriber addresses based on the response to the query.

Gateway 110 may store addresses associated with subscriber 130 in the authorized list of authenticated subscriber addresses, for example, in database 116. In certain embodiments, gateway 110 only maintains authenticated subscriber addresses for as long as their corresponding communication sessions exist. If subscriber 130 communicates another request to gateway 110 for the network service, where the request includes an associated address included in the query response, then gateway 100 can authenticate subscriber 130 without having to direct subscriber 130 to authentication portal 120.

Modifications, additions, or omissions may be made to system 100. System 100 may include more, fewer, or other components. Any suitable component of system 100 may include a processor, interface, logic, memory, and/or other suitable element.

FIGS. 2A-B illustrate sequence diagrams of examples of grouping multiple addresses of subscriber 130 into a single communication session. FIG. 2A illustrates an example of a sequence diagram where gateway 110 requests and receives addresses associated with subscriber 130 directly from subscriber 130. In sequence 200, subscriber 130 communicates request 202 to gateway 110 to initiate a communication session to access network services. Request 202 includes an address associated with subscriber 130. In the example, gateway 110 is unable to authenticate subscriber 130 and redirects subscriber 130 to authentication portal 120 with redirect message 204. Authentication portal 120 authenticates subscriber 130 in authentication session 206. If authentication portal 206 authenticates subscriber 130, authentication portal communicates authorization message 208 to gateway 110.

Once subscriber 130 is authenticated, gateway 110 communicates query 210 to subscriber 130 requesting addresses associated with subscriber 130 (e.g., IPv4 address, IPv6 address, and/or MAC address), where query 210 includes an address of subscriber 130. Query 210 may further include commands, security measures (e.g., nonce, passwords, digital keys, etc), protocols (e.g., internet control message protocol version 4 (ICMPv4), ICMPv6, user datagram protocol (UDP), network layer signaling-transport layer (NLS-TL), or other suitable protocol), or other suitable information. In certain embodiments, query 210 requests specific sets of addresses. For example, gateway 110 may provide network services to group 140 of subscribers 130 in a single communication session (e.g., a household or business with multiple subscribers 130), and the query may request the prefix assigned to the plurality of subscribers and one or more addresses (e.g., IPv4 address, IPv6 address, and/or MAC address) used by the plurality of subscribers 130. Query 210 also may only request a particular address associated with subscriber 130. In the sequence 200, query 210 successfully routes to subscriber 130 and subscriber 130 communicates response 212 to gateway 110, where response 212 includes one or more addresses associated with subscriber 130. Gateway 110 now has a list of addresses associated with subscriber 130 and may add the associated addresses to the list of subscriber addresses authorized to access network services.

FIG. 2B illustrates an example of a sequence diagram where gateway 110 requests associated addresses from subscriber 130 but the request is unable to reach subscriber 130. In sequence 220, subscriber 130 communicates request 202, gateway 110 redirects subscriber 130 to authentication portal 120 with redirect message, authentication portal 120 authenticates subscriber 130 in authentication session 206, authentication portal 120 communicates authentication message 206, and gateway 110 communicates query 210 as discussed above with respect to FIG. 2A.

In sequence 220, router 160 is unable to route query 230 to subscriber 130, for example, because router 160 does not have necessary network bindings to subscriber 130. However, in sequence 220, router 160 has a route to subscriber 130 through intermediate node 150. Router 160 has binding to intermediate node 150, and obtains addresses routable through intermediate node 150 in session 222. Router responds to query 220 with response 224, which includes addresses routable through intermediate node 150.

In sequence 220, response 224 does not include all of the addresses associated with subscriber 130, for example, because a subscriber 130 device is turned off, malfunctioning, adopted a new IP address, or has not yet sent traffic to gateway 110. Gateway 110 receives request 226 from an unknown address during an established communication session. Gateway 110 communicates query 228 to the address included in request 202 used for authentication requesting associated addresses to update the list of authorized subscriber addresses. By this time, router 160 has established necessary network bindings to subscriber 130 and routes query 228 to subscriber 130. Subscriber 130 communicates response 230 including updated addresses associated with subscriber 130. If the unknown address is included in response 230, then gateway 110 updates the authorized list of authenticated subscriber addresses. If an unknown address is not included in response 230, gateway 110 may redirect request 226 to authentication portal 120 for authentication.

Modifications, additions, or omissions may be made to sequences 210 and 220. Sequences 200 and 220 may include more, fewer, or different communications. Sequences 200 and 220 may include more, fewer, or different components.

FIG. 3 illustrates an example of a method for grouping multiple addresses of a subscriber into a single communication session. Method 300 begins at step 302. At step 304, gateway 110 receives a request from subscriber 130 to initiate a communication session to access network services, where the request includes an address of subscriber 130. At step 306, gateway 110 determines whether the address from the request from subscriber 130 is authenticated (e.g., by verifying that the address from the request is part of an authorized list of subscriber addresses). If gateway 110 determines that subscriber 130 is authenticated (e.g., the address in the request from subscriber 130 is on a list of authorized subscriber addresses), the method goes to step 308. At step 308, gateway 110 generates a query requesting addresses associated with subscriber 130, where the query includes the address from the request from subscriber 130. At step 310, gateway 110 communicates the query to the address from the request from subscriber 130. At step 312, gateway 110 receives a response to the query that includes an address associated with subscriber 130. At step 314, gateway 110 stores the address from the request from subscriber 130 and the received address associated with subscriber 130, for example in the authorized list of subscriber addresses.

The method ends at step 316.

If gateway 110 cannot authenticate subscriber 130, the method goes to step 318 and gateway 110 directs subscriber 130 to authentication portal 120 for authentication (e.g., interactive authentication). If authentication portal 120 authenticates subscriber 130 at step 320, then the method goes to step 322 and authentication portal 120 notifies gateway 110 that subscriber 130 is authenticated. If authentication portal 120 cannot authenticate subscriber 130, the method moves to step 324 and subscriber 130 is denied access to network services. The method ends at step 316.

Modifications, additions, or omissions may be made to method 300. The method may include more, fewer, or other steps. Additionally, steps may be performed in any suitable order. Any suitable component of system 100 may perform one or more steps of method 300.

Certain embodiments of the present disclosure may provide one or more technical advantages. A technical advantage of an embodiment is that subscriber 130 associated with multiple addresses only has to be authenticated once for a communication session, and does not need to be re-authenticated if subscriber 130 uses a different address during the session. Another technical advantage of an embodiment is that if gateway 110 is unable to route a query requesting addresses associated with subscriber 130 to subscriber 130, for example, because router 160 does not have network bindings to subscriber 130, the query requests that router 160 identify intermediate node 150 with a route to subscriber 130 and respond to the query with addresses routable through intermediate node 150.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
an interface configured to receive a request from a subscriber to access network services, wherein the request includes a subscriber Internet protocol (IP) address;
a processor configured to:
    determine that the subscriber IP address is authenticated and is authorized to access the network services; and
    generate a query requesting an associated IP address that is associated with the subscriber IP address;
the interface further configured to:
    communicate the query to the subscriber IP address;
    receive a response to the query that includes the associated IP address associated with the subscriber IP address;
a memory configured to store the subscriber IP address and the received associated IP address;
the interface further configured to receive a request from the associated IP address to access the network services; and
the processor further configured to determine that the associated IP address is authorized to access the network services based on the response received from the authenticated subscriber IP address identifying the associated IP address.

2. The apparatus of claim 1, the interface further configured to receive a response to the query from a router if the router is unable to route the query to the subscriber IP address, wherein the response includes one or more IP addresses routable through an intermediate node operable to route the query to the subscriber.

3. The apparatus of claim 1, wherein the query uses at least one protocol from the set comprising Internet Control Message Protocol (ICMP) version 4, ICMP version 6, User Datagram Protocol (UDP), and Network Layer Signaling-Transport Layer (NLS-TL).

4. The apparatus of claim 1, wherein the query includes a nonce to provide security.

5. The apparatus of claim 1, wherein the response includes one or more of the following: an IPv4 address, an IPv6 address, and a combination of IPv4, IPv6 addresses.

6. The apparatus of claim 1, wherein
the processor is further configured to:
    authenticate the subscriber IP address, by comparing the subscriber IP address to a list of addresses authorized to access the network; and
    direct the subscriber to an authentication portal if the gateway cannot authenticate the subscriber IP address;
the interface is further configured to receive a message from the authentication portal, wherein the message indicates whether the subscriber is authenticated; and
the processor is further configured to update the list of authorized addresses with the received associated IP addresses.

7. A non-transitory computer readable medium comprising logic, the logic, when executed by a processor, configured to:

receive a request from a subscriber to access network services, wherein the request includes a subscriber Internet protocol (IP) address;

determine that the subscriber IP address is authenticated and is authorized to access the network services;

generate a query requesting an associated IP address that is associated with the subscriber IP address;

communicate the query to the subscriber IP address;

receive a response to the query that includes the associated IP address associated with the subscriber IP address;

store the subscriber IP address and the received associated IP address;

receive a request from the associated IP address to access the network services; and determine that the associated IP address is authorized to access the network services based on the response received from the authenticated subscriber IP address identifying the associated IP address.

8. The computer readable medium of claim 7, the logic further configured to receive a response to the query from a router if the router is unable to route the query to the subscriber IP address, wherein the response includes one or more IP addresses routable through an intermediate node operable to route the query to the subscriber.

9. The computer readable medium of claim 7, wherein the query uses at least one protocol from the set comprising Internet Control Message Protocol (ICMP) version 4, ICMP version 6, User Datagram Protocol (UDP), and Network Layer Signaling-Transport Layer (NLS-TL).

10. The computer readable medium of claim 7, wherein the query includes a nonce to provide security.

11. The computer readable medium of claim 7, wherein the response includes one or more of the following: an IPv4 address, an IPv6 address, and a combination of IPv4 and IPv6 addresses.

12. A method, comprising:

receiving a request from a subscriber to access network services, wherein the request includes a subscriber Internet protocol (IP) address;

determining that the subscriber IP address is authenticated and is authorized to access the network services;

generating a query requesting an associated IP address that is associated with the subscriber IP address;

communicating the query to the subscriber IP address;

receiving a response to the query that includes the associated IP address associated with the subscriber IP address;

storing the subscriber IP address and the received associated IP address;

receiving a request from the associated IP address to access the network services; and determining that the associated IP address is authorized to access the network services based on the response received from the authenticated subscriber IP address identifying the associated IP address.

13. The method of claim 12, further comprising receiving a response to the query from a router if the router is unable to route the query to the subscriber IP address, wherein the response includes one or more IP addresses routable through an intermediate node operable to route the query to the subscriber.

14. The method of claim 12, wherein the query uses at least one protocol from the set comprising Internet Control Message Protocol (ICMP) version 4, ICMP version 6, User Datagram Protocol (UDP), and Network Layer Signaling-Transport Layer (NLS-TL).

15. The method of claim 12, wherein the query includes a nonce to provide security.

16. The method of claim 12, wherein the response includes one or more of the following: an IPv4 address, an IPv6 address, and a combination of IPv4 and IPv6 addresses.

17. The method of claim 12, further comprising:

authenticating the subscriber IP address, by comparing the subscriber IP address to a list of addresses authorized to access the network; and directing the subscriber to an authentication portal if the gateway cannot authenticate the subscriber IP address;

receiving a message from the authentication portal, wherein the message indicates whether the subscriber is authenticated; and updating the list of authorized addresses with the received associated IP addresses.

\* \* \* \* \*